United States Patent [19]
Yoshida et al.

[11] 3,719,637
[45] March 6, 1973

[54] PROCESS FOR POLYMERIZING TETRAOXANE

[75] Inventors: Masaru Yoshida; Yoshiaki Nakase; Akihiko Ito, all of Takasaki, Japan

[73] Assignee: Japan Atomic Energy Research Institute, Tokyo, Japan

[22] Filed: May 18, 1971

[21] Appl. No.: 144,636

[30] Foreign Application Priority Data

May 20, 1970 Japan ..............................45/42381
July 4, 1970 Japan ..............................45/58143

[52] U.S. Cl. .......................260/67 FP, 204/159.21
[51] Int. Cl. ..........C08f 1/18, C08g 1/00, C08g 11/00
[58] Field of Search ...............260/67 FP; 204/159.21

[56] References Cited

UNITED STATES PATENTS

| | | | |
|---|---|---|---|
| 3,193,532 | 7/1965 | Sidi | 260/67 FP |
| 3,457,226 | 7/1969 | Miyake et al. | 260/67 FP |
| 3,553,090 | 1/1971 | Yamashina et al. | 204/159.21 |
| 3,652,436 | 3/1972 | Nakase et al. | 204/159.21 |

*Primary Examiner*—William H. Short
*Assistant Examiner*—L. M. Phynes
*Attorney*—Stevens, Davis, Miller & Mosher

[57] ABSTRACT

Tetraoxane is polymerized in the presence of both a carboxylic anhydride and a specific polymerization initiator, to obtain an oxymethylene polymer having excellent heat-stability. When thiirane or its derivatives, thiocyanates, or isothiocyanates are employed as the polymerization initiator, the thermal stability of the resulting polymer is further improved. An ionizing radiation or an ultraviolet light can concomitantly be employed before and/or in the course of polymerization.

5 Claims, No Drawings

PROCESS FOR POLYMERIZING TETRAOXANE

BACKGROUND OF THE INVENTION

1. Field of the Invention:

This invention relates to a process for preparing an oxymethylene polymer which comprises polymerizing tetraoxane in the presence of anhydride of an organic carboxylic acid having no ethylenic double bond, by means of a specific polymerization initiator.

2. Description of the Prior Art:

It is well known that oxymethylene polymers can be obtained by polymerizing formaldehyde, trioxane or tetraoxane. However, the polymers thus obtained are inadequate in chemical and thermal stability and are easily depolymerized to formaldehyde. Therefore, these polymers require some stabilization treatment in order that they may be commercially practicable. According to one conventional process, a produced oxymethylene polymer is further treated with a carboxylic acid anhydride to be stabilized, but this process is disadvantageous in that many steps are required for the post-treatment. In another process, formaldehyde is polymerized in the presence of an anhydride of a carboxylic acid, but this process is disadvantageous in that the formaldehyde monomer must be highly purified before the polymerization in order to obtain a satisfactory result.

It is know that tetraoxane is polymerized in the presence of a catalyst such as $BF_3$ (U.S. Pat. No. 3,457,226), but it is disadvantageous in that care must be taken in handling such very reactive catalyst; in addition, such catalyst remaining in the product polymer has to be neutralized after polymerization is completed.

It is also known that trioxane is polymerized in the presence of an anhydride of aliphatic carboxylic acids by means of an ionizing radiation (Japanese Pat. publication No. 26594/1963). In this process, the anhydride only serves to enhance the polymerization rate of the unpurified trioxane and the thermal stability of the resulting polymer is not improved. Japanese Pat. publication No. 20309/1968 discloses a process for copolymerizing trioxane and itaconic anhydride in the presence of a peroxide catalyst; however, the resultant polymer lacks the properties required for an oxymethylene polymer. According to the process disclosed in Japanese Pat. publication No. 15629/1967, a somewhat thermally stabilized oxymethylene polymer is obtained by polymerizing trioxane and itaconic anhydride by means of an ionizing radiation, but the process is disadvantageous in that the polymerization rate is too slow. U.S. Pat. No. 3,346,663 discloses a process for polymerizing trioxane with an anhydride of organic acids in the presence of Lewis acids or Friedel-Crafts catalysts. However, the molecular weight of the polymer is so low that the polymer is not adequate for practical use when an anhydride of organic acids is added to obtain a polymer having good heat stability.

The foregoing demerits in the prior art have been solved by the present invention, whereby thermally stabilized oxymethylene polymers are obtained with greater ease and in higher yield than when trioxane is polymerized, by polymerizing tetraoxane in the presence of an anhydride of a carboxylic acid by means of a specific polymerization initiator. Incidentally, it is to be noted that a process for polymerizing trioxane can not always be applied to a process for polymerizing tetraoxane, since the reactivity of trioxane in the polymerization reaction differs from that of tetraoxane as described for example in U.S. Patent No. 3,457,226; French Pat. No. 1,424,655; J. Polymer Sci., B6, 727 (1964) and the like.

A process for polymerizing a cyclic ether in the presence of maleic anhydride by means of an ionizing radiation or a radical initiator is disclosed in Japanese Pat. publication No. 8829/1968, the examples of which employ 3,3-bis-chloromethyl-oxetane or mixture thereof with trioxane. However, the resultant polymers have no thermal stability. The present invention is clearly distinguished from this process, at least in the use of an anhydride of carboxylic acid having no ethylenic double bond (excluding maleic anhydride, itaconic anhydride, etc.) and use of a different species of polymerization initiators. It is noted that the molecular weight of the resultant polymer markedly decreases and the thermal stability of the polymer is hardly enhanced, when tetraoxane is polymerized in the presence of a small amount of maleic anhydride or itaconic anhydride as shown in the following reference examples. From this fact, it is considered that the function of a carboxylic acid anhydride having no ethylenic double bond differs from that of maleic anhydride or itaconic anhydride.

SUMMARY OF THE INVENTION

An object of this invention is to provide a process for preparing a novel oxymethylene polymer which comprises polymerizing tetraoxane in the presence of an anhydride of a carboxylic acid having no ethylenic double bond by means of a specific polymerization initiator. Another object of this invention is to provide a novel heat-stabilized oxymethylene polymer thus obtained.

Other objects of this invention will become apparent in the following descriptions.

The process of this invention, if desired, can be carried out by the concomitant use of an ionizing radiation or an ultraviolet light in advance of and/or in the course of polymerization.

In the radiation-induced polymerization of tetraoxane no polymer was obtained in the molten phase or in solution (J. Polymer Sci. B1, 427 (1963)). However, in the case of the concomitant use, the polymerization is also carried out in liquid state. The concomitant use brings about a synergistic effect on the rate of polymerization. In other words, the rate is much higher in the case of concomitant use than the sum of the rates where the initiator and radiation are applied separately. Therefore, the effect of ionizing radiation in the presence of the initiators in this invention is essentially different from that of the known use of radiation.

The organic carboxylic acid anhydride to be employed in this invention is at least one species of an anhydride of a carboxylic acid having no ethylenic double bond, which typically includes acetic anhydride, propionic anhydride, butyric anhydride, benzoic anhydride, succinic anhydride and phthalic anhydride etc.

The polymerization initiator to be employed in this invention is selected from iodine, bromine, a halogenohydrocarbon, sulfur, an organic sulfur compound and an electron acceptor, some of the initiators being defined below. Incidentally, trioxane can hardly be polymerized with the initiator specified hereinafter.

The halogenohydrocarbon to be employed in the present invention is represented by the following formula;

$$RX_n$$

wherein R is a radical having one to 15 carbon atoms selected from the group consisting of a saturated or unsaturated aliphatic hydrocarbon residue, a saturated or unsaturated alicyclic hydrocarbon residue and a radical in which any hydrogen atom of the residues is substituted for aryl, alkoxy, carbonyl, alkoxycarbonyl or aryloxycarbonyl radical; X is the same or different kind of halogen atoms selected from the group consisting of F, Cl, Br and I; and $n$ is a positive integer not exceeding 10. Said halogenohydrocarbon is typically exemplified by methylene chloride, ethylene chloride, chloroform, carbon tetrachloride, vinyl chloride, chloral, chloroacetone, chloromethyl acetate, phenyl chloroacetate, hexachloroethane, benzyl chloride, tetrafluoroethylene, dibromotetrafluoroethane, bromoform, tribromoacetaldehyde, aryl bromide, methyl bromide, ethyl bromide, methylene bromide, ethylene bromide, bromal, bromopropene, bromocyclohexane, chlorocyclohexane, benzyl bromide, methyl iodide, ethyl iodide, propyl iodide, isopropyl iodide, ethylene iodide, benzyl iodide, iodoform, 2-bromoethyl ethyl ether, chloromethyl ethyl ether, 2-chloroethyl ether, 3-bromocyclohexene, 3-chlorocyclohexene, and 4-chlorocyclohexene.

The organic sulfur compounds to be used in this invention include the following compounds. The examples of the divalent sulfur compound are thioaldehydes (e.g., trithioformaldehyde, etc.), thioketones (e.g., methyl phenyl thioketone, etc.), thioalcohols (e.g., methyl mercaptan, ethyl mercaptan, methyl thioglycolate, etc.), thiocarbonic anhydrides (e.g., carbon disulfide, carbonyl sulfide, etc.), thiocarbonic ester (e.g., ethylene trithiocarbonate, etc.), thioethers (e.g., methyl sulfide, ethyl sulfide, dimethyl disulfide, tetrahydrothiophene, thiiranes (i.e. episulfides), etc.), thioamides (e.g., acetothioamide, etc.), thiourea and its derivatives (e.g., ethylenethiourea, methyl thiourea, etc.), thiocyanates (methyl thiocyanate, ethyl thiocyanate, etc.) isothiocyanates (e.g., methyl isothiocyanate, ethyl isothiocyanate, etc.), alkylxanthogenates (e.g., ethyl ethylxanthogenate, etc.). The examples of tetravalent or hexavalent sulfur compounds are sulfates (e.g., dimethyl sulfate, diethyl sulfate, etc.), sulfites (e.g., dimethyl sulfite, diethyl sulfite, glycol sulfite, etc.), alkyl sulfones (diethyl sulfone, etc.), alkylsulfoxides (e.g., dimethyl sulfoxide, etc.), sulfonium compounds (e.g., trimethyl sulfonium iodide, etc.), thiophene-derivatives-s-oxide (e.g., dihydrothiophene-1-dioxide, tetrahydrothiophene-1-oxide, tetrahydrothiophene-1-dioxide, etc.), dithiorane-derivatives-s-oxide (e.g., 1,3-dithioranedisulfone, γ-sultone, etc.), oxathianderivatives-s-oxide (e.g., δ-sultone, 1,3-oxathian-1-dioxide, etc.), and trithianoxides (e.g., trimethylenetrisulfoxide, trimethylenetrisulfone, etc.).

Examples of thiiranes, thiocyanates and isothiocyanates which are very useful for thermal stabilization of the produced polymers are shown below. Thiiranes include ethylene sulfide, propylene sulfide, 1-butene sulfide, 2-butene sulfide, isobutene sulfide, trimethylethylene sulfide, tetramethylethylene sulfide, cyclopentene sulfide, cyclohexene sulfide, 4-methylcyclohexene sulfide, cycloheptene sulfide, cyclooctene sulfide, styrene sulfide, 3-mercaptopropylene sulfide, 3-chloropropylene sulfide; and the thiocyanates include methyl thiocyanate, ethyl thiocyanate, propyl thiocyanate, isopropyl thiocyanate, butyl thiocyanate, isobutyl thiocyanate, amyl thiocyanate, isoamyl thiocyanate, allyl thiocyanate, benzyl thiocyanate, and phenyl thiocyanate; and the isothiocyanates include methyl isothiocyanate, ethyl isothiocyanate, n-propyl isothiocyanate, isopropyl isothiocyanate, n-butyl isothiocyanate, benzyl isothiocyanate and phenyl isothiocyanate.

The electron acceptors to be employed in this invention typically include quinones (e.g., benzoquinone, p-chloranil, etc.), nitriles (e.g., tetracyanoethylene, acrylonitrile, etc.), nitro-compounds (e.g., tetranitroethane, nitrobenzene, m-dinitrobenzene, 1,3,5-trinitrobenzene, diphenylpicrylhydrazil, etc.), nitrogen-oxides (e.g., nitrous oxide, nitrogen monooxide, etc.) and sulfur hexafluoride.

DESCRIPTION OF THE PREFERRED EMBODIMENTS

In accordance with this invention, polymerization can be carried out as follows:

At least one species each of an initiator and a carboxylic acid anhydride are added to tetraoxane. When the compound to be added is rather volatile, the polymerization system is confined in a sealed vessel. In the case of solid phase polymerization, the initiator and carboxylic acid anhydride can be added to crystalline tetraoxane in the form of drops, spray or vapor, and if necessary then melt-mixed with tetraoxane and solidified. In liquid phase polymerization, they can be added to the liquid phase containing tetraoxane, or mixed with crystalline tetraoxane and then melted or dissolved into a solution. The initiator and carboxylic acid anhydride can be added to tetraoxane simultaneously or separately by various ways. When two or more species of polymerization initiators or carboxylic acid anhydrides are used, the order of addition, if necessary, may be determined by one skilled in the art according to the natures of the compounds to be added.

The amount of initiator to be added depends on the species thereof, but is generally about $10^{-4} - 10$ percent by weight, preferably about $10^{-3} - 3$ percent by weight of tetraoxane. The amount of carboxylic acid anhydride is about $10^{-3} - 15$ percent by weight, preferably about $10^{-2} - 5$ percent by weight of tetraoxane. When the initiator and carboxylic acid anhydride are solids at room temperature or are used in low concentration, it is advantageous to use them in the form of a solution in a solvent inactive to the initiator, anhydride and formaldehyde, such as benzene or n-hexane etc. The carboxylic acid anhydride can be added to the polymerization system continuously or intermittently as it is consumed instead of charging the total amount from the start of polymerization.

When an ionizing radiation or an ultraviolet light is concomitantly employed, the results are substantially the same whether irradiation is effected before or after the polymerization initiator is added to the polymerization system. A specific initiator such as thiiranes, thiocyanates and isothiocyanates can be irradiated with an ionizing radiation and then added to the polymerization system. In the case of in-source polymerization, a dose rate of about $10^2 - 10^8$ rad/hr is employed. The total dose in post-polymerization is generally about $10^2 - 10^8$ rad. In the case of in-source polymerization (including light irradiation), the irradiation temperature is identical with that of polymerization. In the case of post-polymerization (including light irradiation), the irradiation temperature must be within the range in which tetraoxane is in the solid state. When irradiation is carried out at a temperature higher than 60°C, in-source polymerization proceeds except for the case in which the irradiation time is very short; post-polymerization can of course be effected thereafter. Incidentally, the useful radiations include alpha rays, beta rays, gamma rays, electron beam, X-rays, neutron beam, beams of heavy particles and mixtures thereof. An ultraviolet light from a mercury lamp etc. can also be utilized.

There is no special restriction in the polymerization temperature; however, desirable results are obtained when polymerization is carried out at a temperature of 90°C or higher. The polymerization in solid state is preferable in order to give a product having the higher heat stability. Even when the temperature of the heating bath is higher than the melting point of tetraoxane, polymerization may proceed in the solid state during temperature raise. There is no restriction, either, with respect to the atmosphere in which the polymerization is carried out; polymerization can be carried out either in air, vacuum or an inert gas. The term "solid phase polymerization" referred to herein means polymerization carried out when tetraoxane exists in the solid state (including dispersion), and "liquid phase polymerization" means polymerization carried out when the system containing tetraoxane is in the liquid state. In-source polymerization means polymerization which proceeds during irradiation by means of an ionizing radiation or an ultraviolet light. Post-polymerization means polymerization which proceeds after irradiation in the absence of the radiation source.

After polymerization, the reaction mixture is washed with a solvent such as acetone, benzene, etc. which is a good solvent for both tetraoxane and the additives so that the produced polymer may be separated from the unreacted materials.

Now the invention is illustrated by way of working examples. These examples are included for better understanding of the invention and should not be taken as limiting the scope of the invention. The product of each of the examples is a white crystalline substance. The melting points of the polymers obtained according to the following examples range from 167° to 180°C. The viscosity number $[\eta]$ is determined with respect to a solution in p-chlorophenol containing 2 percent α-pinene at 60°C. The thermal stability of the polymer is indicated as $K_{222}$ (%/minute) which means average thermal decomposition rate when the polymer is heated at 222°C for 1 hour under nitrogen stream. The amount of the additives is indicated in percentage of the basis of the weight of tetraoxane, unless otherwise specified.

EXAMPLE 1

One gram each of tetraoxane purified by sublimation was put in a glass ampoule, and acetic anhydride or propionic anhydride and carbon disulfide or methyl iodide were added thereto in the amounts as shown in Table 1. Polymerizations were carried out at 105°C for 2 hours. After the polymerization, white crystalline polymers were obtained by washing with acetone so as to remove unreacted materials. The polymerization results are shown in Table 1.

TABLE 1

| Polymerization conditions | | | | Results | | |
|---|---|---|---|---|---|---|
| Acid anhydride | | Polymerization initiator | | Yield (percent) | $K_{222}$ (percent/min.) | Viscosity $[\eta]$ |
| Species | Amount (percent) | Species | Amount (percent) | | | |
| Acetic anhydride | 0.1 | Carbon disulfide | 2.5 | 95 | 0.91 | 2.0 |
| | 0.1 | Methyl iodide | 4.5 | 95 | 0.90 | 2.1 |
| | 1.0 | do | 4.5 | 95 | 0.15 | 0.5 |
| | 1.0 | Carbon disulfide | 2.5 | 95 | 0.16 | 0.5 |
| | 5.0 | do | 2.5 | 97 | 0.10 | 0.3 |
| | 5.0 | Methyl iodide | 4.5 | 100 | 0.08 | 0.2 |
| Propionic anhydride | 0.1 | Carbon disulfide | 2.5 | 90 | 0.73 | 2.4 |
| | 0.1 | Methyl iodide | 4.5 | 95 | 0.80 | 3.0 |
| | 1.0 | do | 4.5 | 93 | 0.40 | 0.9 |
| | 1.0 | Carbon disulfide | 2.5 | 97 | 0.23 | 0.7 |
| | 5.0 | do | 2.5 | 97 | 0.12 | 0.3 |
| | 5.0 | Methyl iodide | 4.5 | 94 | 0.10 | 0.4 |
| No acid anhydride added | | do | 4.5 | 95 | 1.22 | 4.3 |
| | | Carbon disulfide | 2.5 | 95 | 1.10 | 3.0 |

COMPARATIVE EXAMPLE 1

One gram of trioxane was put in a glass ampoule and thereto were added 1.0 percent acetic anhydride and 4.5 percent methyl iodide. Polymerization was carried out at 55°C (the temperature being considered to be the most preferable for solid state polymerization of trioxane) for 2 hours. No polymer was obtained.

EXAMPLE 2

One gram each of tetraoxane purified by sublimation was put in a glass ampoule, and thereto were added a carboxylic acid anhydride and an organic solvent if desired, followed by addition of 2.5 percent of carbon disulfide. Polymerizations were carried out at 105°C for 2 hours. Thereafter, the resulting polymers were washed with acetone. The results are shown in Table 2.

TABLE 2

| Polymerization Conditions | | | Results | | |
|---|---|---|---|---|---|
| Acid Anhydride | | | Yield | $K_{222}$ | Viscosity |
| Species | Amount(%) | Solvent | (%) | (%/min) | $[\eta]$ |
| Succinic anhydride | 0.5 | No solvent | 94 | 0.66 | 7.0 |
| | 2.0 | No solvent | 91 | 0.70 | 6.0 |
| Maleic anhydride | 0.5 | No solvent | 96 | 0.83 | 0.9 |
| (Control) | 0.5 | n-hexane | 80 | 0.85 | 0.6 |
| not added (Control) | | | 95 | 1.10 | 3.0 |

EXAMPLE 3

One gram each of tetraoxane purified by sublimation was put in a glass ampoule. Thereto were added 0.5 percent of propionic anhydride and 2.5 percent of methyl iodide.
Polymerizations were carried out at 105°C and 120°C for two hours, and the products were treated as in Example 1. The results are shown in Table 3.

TABLE 3

| Polymerization Temperature | Results Yield (%) | $K_{222}$ (%/min) | Viscosity $[\eta]$ |
|---|---|---|---|
| 105°C | 92 | 0.32 | 1.0 |
| 120°C | 99 | 0.30 | 1.1 |

EXAMPLE 4

One gram each of tetraoxane purified by sublimation was put in a glass ampoule. Thereto were added 0.5 percent of propionic anhydride and a polymerization initiator as given in Table 4. Polymerizations were carried out at 105°C for various periods of time, and the products were treated as in Example 1. The results are shown in Table 4.

TABLE 4

| Polymerization Conditions | | | Results | |
|---|---|---|---|---|
| Time (hr) | Initiator Species | Amount(%) | Yield (%) | $K_{222}$ (%/min) | Viscosity $[\eta]$ |
| 0.5 | Methyl iodide | 4.5 | 87 | 0.60 | 1.3 |
| 1.0 | do | 4.5 | 93 | 0.50 | 1.3 |
| 4.0 | do | 4.5 | 99 | 0.33 | 1.3 |
| 4.0 | Carbon disulfide | 2.5 | 97 | 0.30 | 1.0 |
| 8.0 | do | 2.5 | 95 | 0.30 | 1.0 |
| 8.0 | Methyl iodide | 4.5 | 99 | 0.20 | 1.2 |

EXAMPLE 5

One gram of tetraoxane purified by sublimation was put in a glass ampoule and 0.5 percent of propionic anhydride was added thereto. The mixture was completely melted at 130°C and 4.5 percent of methyl iodide was added thereto, followed by liquid phase polymerization for 2 hours. Thereafter, the product was treated as in Example 1, and the polymer of $K_{222} = 0.85$ %/min, $[\eta] = 1.1$ was obtained in 100 percent yield.

The mixture of 1g tetraoxane purified by sublimation and 0.5 percent of propionic anhydride was dissolved in 1.0 ml methylene chloride at 100°C, 4.5 percent methyl iodide was added thereto. Polymerization was effected for 2 hours, and the polymer of $K_{222} = 0.95$ %/min, $[\eta] = 0.5$ was obtained in 71 percent yield.

EXAMPLE 6

One gram each of tetraoxane purified by sublimation was put in a glass ampoule, and thereto were added 0.5 percent of propionic anhydride and a polymerization initiator as given in Table 5. The ampoules were irradiated with gamma rays from Co-60 at −78°C, and then polymerization was carried out for 2 hours in a 105°C heating bath. Thereafter, the products were treated as in Example 1 in order to remove unreacted materials. The results are shown in Table 5.

TABLE 5

| Polymerization Conditions | | | Results | | |
|---|---|---|---|---|---|
| Initiator Species | Amount(%) | Dose of gamma rays (rad) | Yield (%) | $K_{222}$ (%/min) | Viscosity $[\eta]$ |
| Carbon disulfide | $10^{-5}$ | $1 \times 10^6$ | 67 | 0.90 | 1.4 |
| | $10^{-4}$ | $1 \times 10^6$ | 80 | 0.85 | 1.3 |
| | 0.5 | 0 | 82 | 0.50 | 1.4 |
| | 0.5 | $1 \times 10^6$ | 97 | 0.60 | 1.4 |
| Methyl iodide | $10^{-4}$ | $1 \times 10^6$ | 70 | 0.60 | 1.2 |
| | 0.5 | 0 | 35 | 0.55 | 2.0 |
| | 0.5 | $1 \times 10^6$ | 93 | 0.60 | 1.5 |
| Not added | | $1 \times 10^6$ | 40 | 1.15 | 0.8 |

EXAMPLE 7

One gram of tetraoxane purified by sublimation was put in a glass ampoule, and 0.01 percent of bromine and 1.0 percent of acetic anhydride were added thereto, followed by sealing the ampoule. Polymerization was carried out for 2 hours in 105°C heating bath. A crystalline polymer of $[\eta] = 1.2$ and $K_{222} = 0.31$ was obtained in 95 percent yield.

EXAMPLE 8

One gram of tetraoxane purified by sublimation was put in a glass ampoule, and 1.0 percent of propionic anhydride and 0.01 percent of 1,3,5-trinitrobenzene were added thereto. The ampoule was sealed and polymerization was carried out for 4 hours in a 110°C heating bath. A polymer of $[\eta] = 0.5$, $K_{222} = 0.17$ was obtained in 77 percent yield.

EXAMPLE 9

One gram each of tetraoxane was put in a glass ampoule, and a thiirane and a carboxylic acid anhydride were added thereto as given in Table 6. The ampoules were sealed and irradiated with an ionizing radiation at room temperature. Solid phase polymerizations were carried out at various temperatures. After polymerization, the products were washed with acetone in order to remove unreacted materials, and dried at room temperature for 24 hours. The resulting polymers were white crystalline solid. Polymerization conditions and the results are shown in Table 6.

TABLE 6

| Polymerization conditions | | | | | | | Results | | |
|---|---|---|---|---|---|---|---|---|---|
| Thiiranes | Amount (percent) | Acid anhydride | Amount (percent) | Dose (rad.) | Temp. (°C.) | Time (hr.) | Yield (percent) | $K_{222}$ | $[\eta]$ |
| Ethylene sulfide | 0.05 | Propionic anhydride | 0.01 | $4 \times 10^6$ | 110 | 2 | 99 | 0.15 | 1.8 |
| Propylene sulfide | 2.0 | Succinic anhydride | 2.0 | $1 \times 10^6$ | 90 | 6 | 50 | 0.30 | 1.4 |
| Cyclohexene sulfide | 0.1 | Acetic anhydride | 0.1 | $1 \times 10^6$ | 105 | 2 | 99 | 0.05 | 2.4 |
| Do | 0.1 | do | 1.0 | $1 \times 10^6$ | 105 | 2 | 99 | 0.06 | 1.5 |
| Propylene sulfide | 2.0 | do | 0.1 | $1 \times 10^6$ | 130 | 6 | 99 | 0.17 | 1.4 |
| Reference examples: | | | | | | | | | |
| Ethylene sulfide | 0.05 | | | $4 \times 10^6$ | 110 | 2 | 99 | 0.24 | 2.5 |
| Propylene sulfide | 2.0 | | | $1 \times 10^6$ | 90 | 6 | 50 | 0.45 | 2.5 |
| Cyclohexene sulfide | 0.1 | | | $1 \times 10^6$ | 105 | 2 | 99 | 0.20 | 4.0 |
| | | Acetic anhydride | 1.0 | $1 \times 10^6$ | 105 | 2 | 70 | 0.95 | 0.9 |
| | | Succinic anhydride | 2.0 | $1 \times 10^6$ | 90 | 6 | 33 | 0.98 | 1.3 |

EXAMPLE 10

Two(2) grams each of tetraoxane purified by sublimation was put in a glass ampoule. Polymerizations were carried out under the conditions given in Table 7 in liquid phase. After polymerization, the products were treated as in Example 9. The results are shown in Table 7.

TABLE 7

| | Polymerization conditions | | | | | | Results | | |
|---|---|---|---|---|---|---|---|---|---|
| Solvent | Amount (percent) | Proprene sulfide, amount (percent) | Propionic anhydride, amount (percent) | Dose (rad.) | Temp. (°C.) | Time (hr.) | Yield (percent) | $K_{222}$ | $[\eta]$ |
| Cyclohexane | | 1.0 | 1.0 | | 130 | 2 | 98 | 0.21 | 1.4 |
| Do | 100 | 1.0 | 1.0 | | 100 | 2 | 21 | 0.33 | 1.1 |
| Do | 100 | 1.0 | 1.0 | ¹1×10⁶ | 100 | 1 | 65 | 0.21 | 1.0 |
| | | 1.0 | | | 130 | 2 | 99 | 0.70 | 2.5 |
| Reference examples: | | | | | | | | | |
| Cyclohexane | 100 | 1.0 | | ¹1×10⁶ | 100 | 1 | 65 | 0.47 | 1.7 |
| Do | 100 | | 1.0 | ¹1×10⁶ | 100 | 1 | <1 | | |

¹ In-source.

EXAMPLE 11

Ten(10) grams of tetraoxane purified by sublimation was irradiated with $1 \times 10^5$ rad gamma rays from Co-60 at room temperature, and then was put in a glass ampoule, followed by addition of 1.0 percent propylene sulfide and 0.1 percent propionic anhydride. The ampoule was sealed and polymerization was carried out for 6 hours in 105°C heating bath. After the polymerization, the product was treated as in Example 9. A polymer of $K_{222} = 0.06$, $[\eta] = 1.9$ was obtained in 98 percent yield.

The above experiment was repeated except that the mixture of tetraoxane and the additives instead of only the tetraoxane was irradiated after the ampoule was sealed and before polymerization was carried out. Substantially the same result was obtained.

EXAMPLE 12

One gram of tetraoxane purified by sublimation incorporating 0.1 percent of cyclohexene sulfide and 1.0 percent of succinic anhydride was polymerized for 1 hour at 100°C in the same manner as in Example 9, except that ultraviolet light from high pressure mercury lamp (Toshiba HLS-4002 Type) was employed instead of gamma rays. A polymer of $[\eta] = 1.7$, $K_{222} = 0.30$ was obtained in 71 percent yield.

EXAMPLE 13

One gram each of tetraoxane purified by sublimation was put in a glass ampoule, and a thiocyanate and a carboxylic acid anhydride were added thereto as given in Table 8. The ampoules were sealed and irradiated at room temperature with gamma rays from Co-60 in the dose of $10^4 - 10^6$ rad, followed by polymerization at 105°C. After the polymerization, the products were washed with acetone and dried under reduced pressure. White, crystalline and powdery polymers were obtained, which have melting points ranging from 166° to 172°C. The polymerization conditions and results are shown in Table 8.

TABLE 8

| | Polymerization conditions | | | | | Results | | |
|---|---|---|---|---|---|---|---|---|
| Thiocyanate | Percent | Acid anhydride | Percent | Dose (rad.) | Polymerization time (hr.) | Yield (percent) | $K_{222}$ | $[\eta]$ |
| Methyl thiocyanate | 5.0 | Propionic anhydride | 1.0 | | 1 | 76 | 0.40 | 1.7 |
| Do | 5.0 | do | 1.0 | 10⁶ | 1 | 98 | 0.18 | 1.4 |
| Ethyl thiocyanate | 3.0 | Acetic anhydride | 0.01 | 10⁵ | 4 | 99 | 0.06 | 1.6 |
| Do | 3.0 | do | 2.0 | 10⁵ | 4 | 99 | 0.03 | 0.7 |
| Do | 3.0 | Propionic anhydride | 1.0 | 10⁵ | 4 | 99 | 0.05 | 1.4 |
| Do | 1.0 | Succinic anhydride | 2.0 | 10⁵ | 4 | 99 | 0.07 | 2.2 |
| Benzyl thiocyanate | 1.0 | Propionic anhydride | 0.1 | 10⁵ | 2 | 65 | 0.32 | 2.0 |
| Do | 1.0 | do | 1.0 | 10⁵ | 2 | 70 | 0.35 | 1.7 |
| Control: | | | | | | | | |
| Ethyl thiocyanate | 3.0 | | | 10⁵ | 4 | 98 | 0.12 | 4.3 |
| | | Propionic anhydride | 1.0 | 10⁵ | 2 | 38 | 1.01 | 2.3 |
| Benzyl thiocyanate | 1.0 | | | 10⁵ | 2 | 60 | 0.43 | 3.3 |

COMPARATIVE EXAMPLE 2

One gram of trioxane was put in a glass ampoule and thereto were added 1.0 percent propionic anhydride and 5.0 percent methyl thiocyanate. Polymerization was carried out at 55°C (which being considered as the most preferable temperature for solid state polymerization of trioxane) for 1 hour. No polymer was obtained.

EXAMPLE 14

Example 13 was repeated at various polymerization temperatures. The polymerization conditions and results are shown in Table 9.

TABLE 9

| | Polymerization conditions | | | | | | Results | | |
|---|---|---|---|---|---|---|---|---|---|
| Thiocyanate | Percent | Acid Anhydride | Percent | Dose (rad.) | Temp. (°C.) | Time (hr.) | Yield (percent) | $K_{222}$ | $[\eta]$ |
| Methyl thiocyanate | 5.0 | Propionic anhydride | 0.05 | | 90 | 1 | 50 | 0.73 | 2.3 |
| Do | 5.0 | do | 0.05 | 10⁶ | 90 | 1 | 83 | 0.46 | 2.1 |
| Ethyl thiocyanate | 3.0 | Acetic anhydride | 1.0 | 10⁵ | 105 | 4 | 99 | 0.07 | 1.4 |
| Do | 1.0 | Succinic anhydride | 2.0 | | 140 | 1 | 99 | 0.11 | 1.8 |
| Do | 1.0 | do | 1.0 | 10⁵ | 105 | 4 | 99 | 0.09 | 2.2 |
| Control: | | | | | | | | | |
| Methyl thiocyanate | 5.0 | | | 10⁶ | 90 | 1 | 71 | 0.77 | 3.5 |
| | | Succinic anhydride | 1.0 | 10⁵ | 105 | 4 | 70 | 1.21 | 2.0 |

EXAMPLE 15

Ten(10) grams each of tetraoxane purified by sublimation was put in a glass ampoule, and thereto were added 0.05 percent of propionic anhydride and 5.0 percent of methyl thiocyanate, followed by polymerization in liquid phase. After the polymerization, the products were treated as in Example 13. The polymerization conditions and results are shown in Table 10.

TABLE 10

| Solvent | Polymerization conditions | | | | Results | | |
| --- | --- | --- | --- | --- | --- | --- | --- |
| | Percent | Temp. (°C.) | Dose (rad.) | Time (hr.) | Yield (percent) | $K_{222}$ | $[\eta]$ |
| None | | 130 | | 2 | 92 | 0.46 | 0.8 |
| Cyclohexane | 100 | 100 | | 2 | 40 | 0.88 | 1.4 |
| Do | 100 | 100 | ¹ 10⁵ | 1 | 58 | 0.50 | 1.0 |
| Control: | | | | | | | |
| Cyclohexane ² | 100 | 100 | ¹ 10⁵ | 1 | 49 | 1.10 | 1.1 |

¹ In-source.
² No anhydride employed.

EXAMPLE 16

One gram of tetraoxane purified by sublimation incorporating 1.0 percent of ethyl thiocyanate and 2.0 percent of succinic anhydride was polymerized for 1 hour in 100°C heating bath in the same manner as in Example 13, except that irradiation with ultraviolet light from high pressure mercury lamp (Toshiba HLS–4002 Type) was employed instead of that with gamma rays. A white polymer of $[\eta] = 2.1$ and $K_{222} = 0.31$ was obtained in 86% yield.

When the above experiment was carried out without incorporating succinic anhydride, the $K_{222}$ and $[\eta]$ of the resultant polymer were 0.70 and 3.2 respectively.

EXAMPLE 17

One gram of tetraoxane purified by sublimation was put in a glass ampoule, and 1.0% of propionic anhydride and 1.0 percent of methyl isothiocyanate were added thereto. The ampoule was sealed and polymerization was carried out for 8 hours in 105°C heating bath. A polymer of $[\eta] = 1.2$ and $K_{222} = 0.32$ was obtained in 25 percent yield.

When succinic anhydride was not used in the above experiment, the $[\eta]$ and $K_{222}$ of the resultant polymer were 1.7 and 0.97 respectively.

EXAMPLE 18

The starting mixture of Example 17 was irradiated with $2 \times 10^6$ rad gamma rays and then polymerized in the same way as in Example 17. A polymer of $[\eta] = 2.0$ and $K_{222} = 0.19$ was obtained in 88 percent yield.

What we claim is:

1. A process for preparing an oxymethylene polymer which comprises polymerizing tetraoxane in the presence of at least one species of anhydride of an organic carboxylic acid having no ethylenic double bond in an amount of about $10^{-3}$–15% by weight of tetraoxane and at least one species of an organic sulfur polymerization initiator selected from the group consisting of a thiocyanate and an isothiocyanate in an amount of about $10^{-4}$–10% by weight of tetraoxane.

2. A process as set forth in claim 1, in which said thiocyanate is selected from the group consisting of methyl thiocyanate, ethyl thiocyanate, propyl thiocyanate, isopropyl thiocyanate, butyl thiocyanate, isobutyl thiocyanate, amyl thiocyanate, isoamyl thiocyanate, allyl thiocyanate, benzyl thiocyanate and phenyl thiocyanate.

3. A process as set forth in claim 1, in which said isothiocyanate is selected from the group consisting of methyl isothiocyanate, ethyl isothiocyanate, butyl isothiocyanate, isobutyl isothiocyanate, allyl isothiocyanate, phenyl isothiocyanate and benzyl isothiocyanate.

4. The process of claim 1, wherein ionizing radiation is concomitantly employed.

5. The process of claim 1, wherein ultraviolet light is concomitantly employed.

* * * * *